US008131959B2

(12) United States Patent
Heinrich

(10) Patent No.: US 8,131,959 B2
(45) Date of Patent: Mar. 6, 2012

(54) METHOD AND ARRANGEMENT FOR SECURING USER-DEFINABLE DATA OF A FRANKING MACHINE

(75) Inventor: Clemens Heinrich, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 951 days.

(21) Appl. No.: 12/036,558

(22) Filed: Feb. 25, 2008

(65) Prior Publication Data

US 2008/0301387 A1 Dec. 4, 2008

(30) Foreign Application Priority Data

Feb. 28, 2007 (DE) ........................ 10 2007 010 114

(51) Int. Cl.
*G06F 12/16* (2006.01)

(52) U.S. Cl. .......................... 711/162; 705/60; 705/405

(58) Field of Classification Search ........................ None
See application file for complete search history.

(56) References Cited

U.S. PATENT DOCUMENTS 4,837,714 A * 6/1989 Brookner et al. ............. 702/108
5,077,694 A 12/1991 Sansone et al.
5,513,112 A * 4/1996 Herring et al. ................ 705/404
6,049,775 A * 4/2000 Gertner et al. ..................... 705/8
6,820,066 B1 * 11/2004 Reisinger et al. ............. 705/410
7,567,940 B1 7/2009 Engelberg et al.
7,613,639 B1 11/2009 Ogg
2002/0133471 A1 9/2002 Eskandari et al.
2005/0137988 A1 * 6/2005 Harris et al. .................. 705/401
2005/0210525 A1 * 9/2005 Carle et al. .................... 725/105
2006/0149859 A1 * 7/2006 Dubal et al. ...................... 710/8
2008/0005380 A1 * 1/2008 Kawasaki et al. ................ 710/15
2008/0126670 A1 * 5/2008 Ehresmann et al. .......... 711/100

FOREIGN PATENT DOCUMENTS

WO WO 99/48053 9/1999

* cited by examiner

*Primary Examiner* — Kaushikkumar Patel

(74) *Attorney, Agent, or Firm* — Schiff Hardin LLP

(57) ABSTRACT

In a method for data backup of a franking machine in which, in a data backup step, a connection is established between the franking machine and a remote data center via a communication network, data stored in the franking machine are transmitted to the data center as backup data in a transmission step, and the backup data are stored in the data center in a storage step. The backup data include user-definable configuration data of the franking machine that are definable by the user of the franking machine for configuration of the franking machine.

24 Claims, 2 Drawing Sheets

METHOD AND ARRANGEMENT FOR SECURING USER-DEFINABLE DATA OF A FRANKING MACHINE

BACKGROUND OF THE INVENTION

1. Field of the Invention

The present invention concerns a method for backing up data of a franking machine of the type wherein a connection between the franking machine and a remote data center is initially established via a communication network in a connection step; data stored in the franking machine are transmitted to the data center as backup data in a transmission step; and the backup data are stored in the data center in a storage step. The invention furthermore concerns a method for configuration of a franking machine in which such a method for data backup is applied. The invention also concerns a corresponding arrangement for data processing, a corresponding franking machine as well as a corresponding data center.

2. Description of the Prior Art

In contemporary franking machines the security data and usage data of the franking machine that are stored in a security module of the franking machine or at another point are transmitted to the data center at predeterminable points in time (for example at regular time intervals or upon each communication of the franking machine with the remote data center) and are stored at the data center for data backup. The term "security data," as used herein means data that are used in connection with the execution of security-relevant functions of the franking machine (for example thus cryptographic keys, digital signatures, cryptographic certificates etc.). The term "usage data" as used herein means data that are representative of the actual usage of the franking machine (for example the contents of the postal register or data that reflect the usage, itemized according to different postal products).

The usage data are evaluated (for example statistically) in the data center in order to be able to influence the usage of the franking machine (as is known, for example, from EP 0 375 330 A2).

Due to the generally relatively low data transfer capacities of conventional franking machines, the data backup is normally limited only to the most necessary data (which is normally the security data and usage data described above), consequently the data that are directly connected with the documentation of the integrity and usage of the franking machine, and on which the user has at best indirect influence (by the usage of the franking machine).

While the security data and usage data described above are protected from data loss by this known backup, in the known franking machines the problem exists that a data loss that goes beyond the data included in the backup can occur, for example given a destruction of components of the franking machine, in particular the memory components of the franking machine. Configurations of the franking machine that can be defined by the user, for example the setup of cost centers, stored and freely selectable or even definable cliché data for the franking imprints (for example advertisement clichés for different occasions etc.), are normally lost. These must normally be re-entered into the franking machine by hand in a complicated manner.

A further problem of the presently known franking machines is that new or newly-initialized franking machines must be configured by hand by the user (insofar as functions and settings of the franking machine that can be defined by the user are concerned) in a relatively complicated manner in order to bring them up to the desired state.

SUMMARY OF THE INVENTION

An object of the present invention is to provide a method for data backup, a method for configuration of a franking machine, an arrangement for data processing, a franking machine, and a data center of the aforementioned type which do not exhibit the aforementioned disadvantages, or exhibit them at least to a lesser degree, and that enable a simple configuration or reconfiguration of the franking machine.

The present invention is based on the insight that a simple configuration or reconfiguration of a franking machine is enabled when backup data for the appertaining franking machine itself or a master franking machine are stored in a data center, the backup data including the user-definable configuration data of the franking machine, namely data that are definable by the users of the franking machine for configuration of the franking machine.

In the case of a data loss in the franking machine itself this enables a reconfiguration to be implemented, i.e. the last saved user-definable configuration, thereof to be reestablished. Additionally, with such a data backup it is possible both to transfer a user-definable configuration of a damaged franking machine to a replacement franking machine and to transfer the user-definable configuration of a master franking machine to one or more other franking machines.

In accordance with the invention it is thus possible in a simple manner to enable, for the user of a new franking machine a fast and simple configuration of the user's own franking machine by the user initially selecting from a pool of master franking machines that franking machine whose user-definable configuration comes closest to the user's preferences. The user can subsequently simply load the corresponding portions of the backup data of the selected master franking machine into the user's franking machine and achieve a fast configuration of the user's new franking machine in this manner.

The master franking machine can alternatively be a different franking machine likewise operated by the user of the new franking machine. With the present invention the user of both franking machines (for example, an organization with a number of departments the franking machines are respectively operated in) can then ensure in a simple manner that both franking machines exhibit the same user-definable configuration.

According to one aspect, the present invention therefore concerns a method for data backup of a franking machine in which a connection between the franking machine and a remote data center is initially established via a communication network in a connection step, data stored in the franking machine are transmitted to the data center as backup data in a transmission step, and the backup data are stored in the data center in a storage step. The backup data include user-definable configuration data of the franking machine that are definable by the user of the franking machine for configuration of the franking machine.

The user-definable configuration data can in principle include arbitrary data directly and freely definable by the user. The configuration data advantageously include, among other things, data for configuration of functions of the franking machine. Among these are configuration data determinable by the user that define how certain data recorded or accumulating in the operation of the franking machine are stored to simplify later evaluations. These configuration data thus can be data for organization of the storage of usage data of the franking machine.

Additionally or alternatively, the configuration data can include user-definable data for configuration of a franking imprint that is to be generated by the franking machine. For example, such data can be data regarding the user-selectable cliché for a franking imprint that can be generated by the franking machine. Such data can have been generated at the franking machine by the user. It is likewise possible to incorporate cliché data loaded from an external source into the franking machine.

The configuration data can include, for example, user-definable data for establishment of menu sequences and/or menu contents of the franking machine. Additionally or alternatively, the configuration data can include user-definable data for association of functions of the franking machine with operations of input devices of the franking machine. For example, such data can be the function assignment of specific buttons or button combinations of the franking machine.

The data backup step can ensue at arbitrary points in time or upon occurrence of arbitrary, predeterminable temporal or non-temporal events. For example, the data backup step can ensue upon every n-th communication ($n \geqq 1$) of the franking machine with the data center. In preferred variants of the inventive method it is provided that the data backup step ensues at predeterminable points in time in order to ensure a regular data backup. Additionally or alternatively, the data backup step can be initiated by an input (for example by a user or service technician) into the franking machine in order to not be bound to a predetermined temporal process.

Furthermore, the data backup step can be implemented every time when the appertaining predetermined temporal or non-temporal event occurs. However, in order to achieve an optimally economic operation, it is preferable that the data backup step be implemented only when the data backup step is to be implemented for the first time after an initialization of the franking machine or a change of the user-definable configuration data has occurred since the last implementation of the data backup step. The data backup step is consequently thus only implemented when it is required to bring the data set in the data center up to a current state. Unnecessary data transfers thus can be avoided.

It will be understood that, to reduce the transferred data quantity, the data transferred and stored in the framework of the data backup step can be limited to data for which an update requirement exists in the data center. For example, only user-definable configuration data, for which a relevant change has occurred since the last data backup step, need be transferred as backup data.

The data backup step can be implemented in the framework of the execution of its own separate service protocol in which the data backup step is implemented as a sole service between the franking machine and the data center. In other variants of the invention the data backup step is embedded in a service protocol in the execution of which another service or a number of further services are implemented between the franking machine and the data center. In other words, the data backup step can be implemented in the framework of a service executed between the franking machine and the data center, and the data backup step can be a sub-service of a service executed between the franking machine and the data center and including at least one further sub-service. By this (advantageously arbitrarily variable) embedding of the data backup step into a workflow with other services, it is possible in a simple manner to implement the data backup step when a communication between the franking machine and the data center is already occurring anyway.

In principle the backup data can be stored in the data center in any suitable manner. For example, the back-up data can simply be stored in a special memory of the data center that is associated with the franking machine. Another alternative is that, in the storage step, the configuration data are stored linked with an ancillary information in the data center, the ancillary information enabling a more robust and variable handling of the backup data.

The ancillary information can in principle exhibit an arbitrarily suitable and desired information content. The ancillary information can include an identification of the data backup step, that is preferable freely definable by the user. Additionally or alternatively, the ancillary information can include a time information representative of the point in time of the implementation of the data backup step. In both cases it is possible, given a parallel storage of the backup data of a number of data backup steps, to also identify and select a specific data backup step at a later point in time using its identification or the information relating to its point in time.

Additionally or alternatively, the ancillary information can include an identification of the franking machine (for example serial number) and/or of the user (for example customer number) of the franking machine in order to enable a simple association of the backup data with the franking machine and the new information respectively. Furthermore, the ancillary information can include configuration information representative of the non-user-definable configuration of the franking machine. This is, for example, the type, the software version, etc. of the franking machine.

The ancillary information also can include authorization information required for authorization of the access to the backup data. It is thus possible in a simple manner to fix the supervision of the access to the backup data directly to the backup data. In the simplest case, the authorization information is a password. However, any other (in particular arbitrarily complex) authorization mechanism can also be implemented.

It is possible for only the current backup data to be stored in the data center, meaning that upon an implementation of the data backup step old backup data are wiped (for example overwritten). It is also possible for the backup data from a number of data backup steps to be stored in the data center in order to achieve in a simple manner the possibility of reconstructing an earlier configuration state which has already been followed by a number of changes, and in particular a number of data backup steps. For example, it is thus possible in a simple manner to correct incorrect settings that have gone undetected over a longer period of time.

The transmission of the backup data as well as the storage thereof can ensue in any suitable manner. A special securing of the data can hereby be foregone. It is possible for the transmission of the backup data in the transmission step and/or the storage of the backup data in the storage step to ensue using a cryptographic security technique. The securing can be done such that the backup data are secured from unauthorized access (read and/or write access) and/or from undetected manipulation.

The backup data can merely be stored for the purpose of the configuration or reconfiguration of franking machines. Preferably, however, the backup data are processed further (in particular are evaluated) in the data center and/or in a further data processing device that can be connected with the data center. In particular it is possible for the further data processing device to execute an administration program associated with the user of the franking machine, this administration program further processing the backup data. For example, cost center data from cost centers that are freely definable by the user can be evaluated and further processed for statistical purposes. It is in particular possible to enter such data directly into an inventory control system of the user so that an elaborate, mostly manual transfer of such data is no longer required.

The present invention furthermore concerns a method for configuration of a franking machine in which backup data including user-definable configuration data of a franking machine are stored in a remote data center in a data backup step with the aforementioned inventive method for data backup, and at least one portion of the backup data is loaded from the data center into a franking machine in a configuration step and is used for configuration of the franking machine.

As already mentioned, the backup data can be loaded again into the same franking machine. In advantageous variants of the invention, however, the backup data originate from a first franking machine and are used for configuration of at least one second franking machine in the configuration step. As described above, it is thus possible in a simple manner to configure a replacement franking machine or one or more further franking machines corresponding to the first franking machine.

The configuration step can in turn be implemented upon the occurrence of arbitrary predeterminable temporal or non-temporal events. In order to achieve a prompt configuration of the second franking machine, it can be provided that the configuration step can ensue upon the next establishment of a connection of the second franking machine with the data center following the data backup step. In other words, the configuration of the second franking machine can be compelled as soon as the second franking machine establishes a connection with the data center.

The configuration of the franking machine in the configuration step can ensue exclusively with the backup data stored in the last data backup step. In preferred variants of the invention, however, it is possible to effect a modification of the backup data in order to achieve an adaptation of the user-definable configuration data (and thus the configuration of the franking machine) in the configuration step.

It is therefore preferable that the user-definable configuration data stored in the data center be modified in a modification step which follows after the data backup step and precedes the configuration step. At least the user-definable configuration data modified in the modification step are loaded into the franking machine in the configuration step and are used to configure the franking machine.

The modification can be implemented by any properly authorized party. In particular, the user of the franking machine can effect the corresponding modification. For this purpose, for example, the data center can enable the user to access the stored configuration data via a possible correspondingly-secured access (for example a web portal or the like). In this manner the user can effect the configuration of a number of franking machines configured using the configuration data of the master franking machine, for example by the modification of the configuration data of a master franking machine in one step.

The modification can relate to any user-definable configuration data. The modification can be particularly advantageously used in connection with the selection and/or adaptation of cliché data for the franking imprint generated by the respective franking machine. For example, it can thus be provided that the data center can enable the user to access a catalog of cliché data available to the user via an access source (for example a web portal or the like). The user can select the desired cliché whose data are then introduced into the stored backup data in the modification step.

In preferred variants of the inventive method, therefore, the user-definable configuration data include cliché data for a franking imprint that can be generated by the franking machine, and the cliché data are modified in the modification step, wherein the modification of the cliché data ensues by replacement of the previous cliché data with new cliché data. The new cliché data can thereby be selected from a number of different available cliché data dependent on a specification of the user of the franking machine.

The present invention furthermore concerns an arrangement for data processing with a franking machine that has a first memory and a remote data center that has a second memory. The franking machine and the data center are fashioned to establish a connection with one another via a communication network in a data backup step, to transmit data stored in the first memory to the data center as backup data, and to store the backup data in the second memory. According to the invention, the backup data include user-definable configuration data of the franking machine that are definable by the user of the franking machine to configure the franking machine.

The variants and advantages of the inventive method described above can be realized to the same degree with this arrangement.

The present invention furthermore concerns a franking machine that embodies the features described above as well as a data processing device that embodies the features described above. The variants and advantages of the inventive method described above again can be realized to the same degree.

DESCRIPTION OF THE PREFERRED EMBODIMENTS

In the following a preferred embodiment of the inventive arrangement 101 for data processing is described with reference to FIGS. 1 and 2, with which arrangement 101 a preferred variant of the inventive method for configuration of a franking machine is implemented using a preferred variant of the inventive method for data backup.

Figure 1:
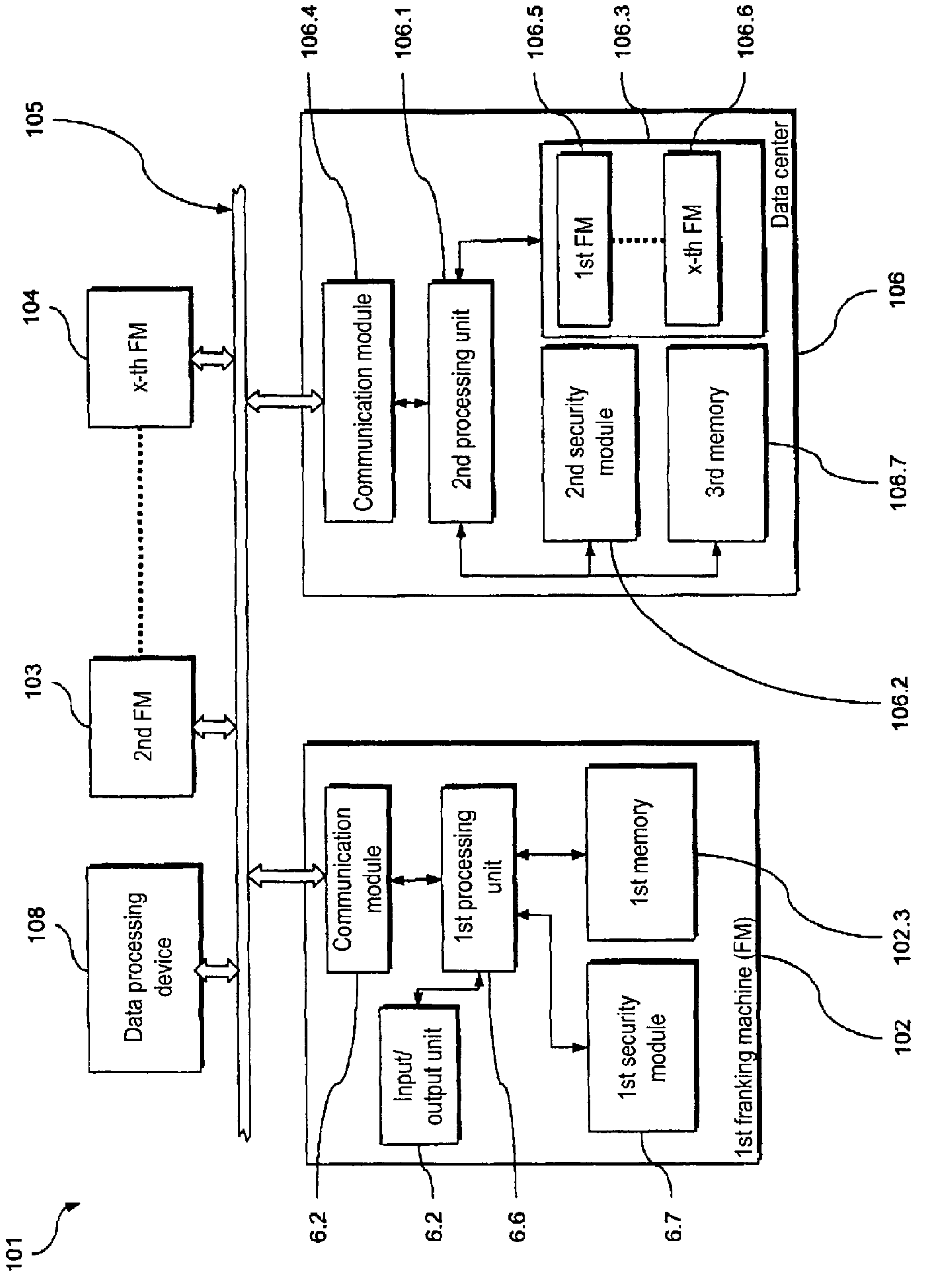
FIG. 1 schematically illustrates a preferred embodiment of the inventive arrangement for data processing with which a preferred variant of the inventive method can be implemented for configuration of a franking machine using a preferred variant of the inventive method for data backup.
Figure 2:
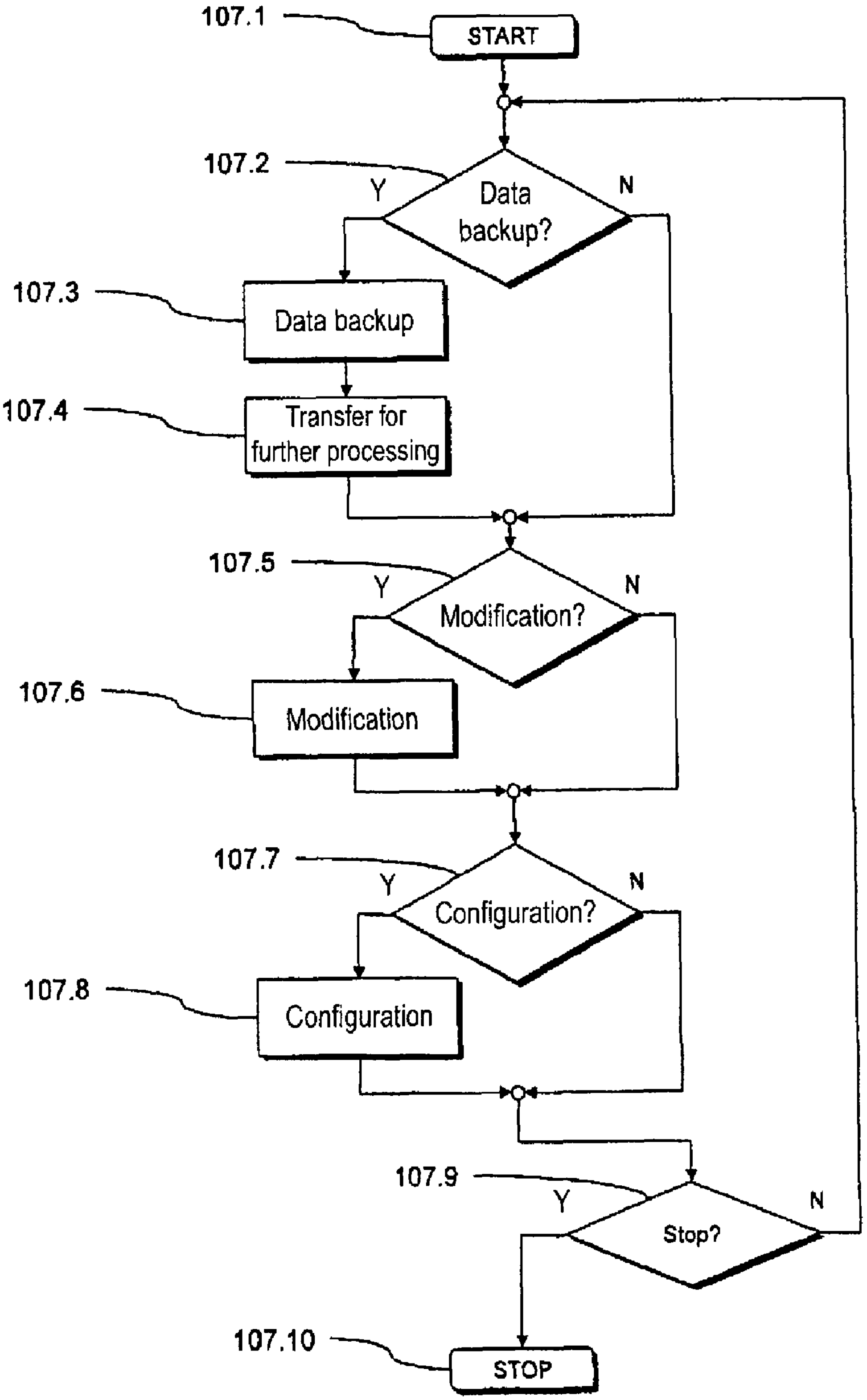
FIG. 2 is a flowchart of a preferred variant of the inventive method for configuration of a franking machine which can be implemented with the arrangement of FIG. 1.

As is to be seen from FIG. 1, the arrangement 101 comprises a series of x franking machines (FM) to which belong, among other things, a first franking machine 102, a second franking machine 103 and a third franking machine 104. The franking machines 102 through 104 can respectively be connected with a remote data center 106 via a communication connection (for example a data network 105).

In addition to the typical components (not shown in FIG. 1) required for franking of mail pieces, the franking machine 102 has, among other things, a first processing unit in the form of a first processor 102.1, a first security module 102.2, a first memory 102.3, an input/output unit 102.4 as well as a communication module 102.5 that are respectively connected with the first processor 102.1.

The first security module 102.2 serves in a typical manner to provide the security-relevant postal services required for the franking, such as (for example) the secure billing of the franking values but also the cryptographic securing of specific postal data. Furthermore, the first security module 102.2 enables the implementation of cryptographic operations for the purposes of the securing of further data as well as the communication via the data network 105.

For the secure billing of the franking values the first security module 102.1 comprises in a sufficiently known manner a processor, a cryptography module for implementation of cryptographic operations (using cryptographic algorithms and parameters) as well as corresponding (possibly redundantly present) registers for the storage of the billing data that are arranged in a region physically and logically secured against unauthorized access.

The data center 106 has a second processing unit 106.1, a second security module 106.2, a second memory 106.3 and a communication module 106.4 that are respectively connected with the second processing unit 106.1. The second security module 106.2 provides security-relevant services in a sufficiently known manner, such as (for example) the cryptographic securing of specific postal or non-postal data or the communication via the data network.

As shall be explained in the following using the first franking machine 102 (representative for all remaining franking machines), a data backup in which specific data of the franking machine 102 are stored in the data center can be effected with the arrangement 101 for the first franking machine 102. Furthermore, a configuration of the first franking machine 102 or of one or more other franking machines 103, 104 can be effected with the arrangement 101 using the data stored in the framework of this data backup.

The method workflow of the inventive method for configuration of a franking machine is initially started in a step 107.1. In a step 107.2 it is then checked whether the inventive method for data backup should be implemented. This check can ensue both in the franking machine 102 and in the data center 106.

Any data of the franking machine 102 can be defined as backup data and be saved in the data center 106 in the framework of the data backup. The backup data can comprise, among other things, postal data (for example the register states of the security module 102.2, cryptographic certificates, etc.) or configuration data of the franking machine 102 that cannot be freely defined by the user of the franking machine 102 (for example information regarding type, the software version, etc.).

In any case, according to the present invention the backup data comprise user-definable configuration data of the franking machine 102. These can in principle be any data directly and freely definable by the user. Among other things, the configuration data advantageously include data for configuration of functions of the franking machine 102. These are, among other things, configuration data determinable by the user that define how specific data recorded or accumulating in the operation of the franking machine 102 are stored (for example for simplification of later evaluations). In other words, these can be data regarding organization of the storage of usage data of the franking machine.

An example for such organizational data are data regarding user-established cost centers with which the usage of the franking machine 102 (and thus the consumption of postage) is associated. In addition to the purely organizational data (for example number, designation, consumption limits etc. of the cost centers), the backup data advantageously also comprise the data associated with the cost centers in operation (for example consumption data etc.) in order to likewise protect these from a data loss.

In addition or alternatively, the configuration data can also comprise data definable by the user of the franking machine 102 for configuration of a franking imprint generable by the franking machine 102. For example, these can be data regarding clichés selectable by the user for the franking imprint. These data can on the one hand have been generated by the user himself at the franking machine 102 (for example via input of a text via the input/output unit 102.4). It is likewise possible to incorporate user-selectable cliché data loaded from the outside into the franking machine 102 (which cliché data have, for example, been loaded into the franking machine 102 via a memory card plugged into the franking machine 102 or from the data center).

The user-definable configuration data can likewise be, for example, user-definable data of the franking machine 102 for determination of menu sequences and/or menu contents of the franking machine. Additionally or alternatively, the configuration data can include user-definable data regarding the association of functions of the franking machine with operations of the input/output unit 102.4. These data can be, for example, the function allocation of specific buttons or button combinations of the input/output unit 102.4.

Any suitable criteria can be established given whose fulfillment the data backup should be implemented. The data backup can ensue at any points in time or upon occurrence of arbitrary predeterminable temporal or non-temporal events. For example, the data backup step can ensue upon every n-th communication ($n \geqq 1$) of the franking machine 102 with the data center 106. Additionally or alternatively, the data backup can ensue at predeterminable points in time in order to ensure a regular data backup. The data backup can additionally or alternatively ensue triggered by a corresponding input (for example of a user or service technician) into the franking machine 102 via the input/output unit 102.4.

In order to achieve an optimally economic operation, it is provided that the data backup is implemented only when it is to be implemented for the first time after an initialization of the franking machine 102 or a change of the data to be backed up has occurred since the last implementation of the data backup. The data backup is thus actually implemented only when it is required to bring the data set in the data center 106 up to the current state. Unnecessary data transfers thus can be avoided.

Moreover, it is hereby understood that, to reduce the data quantity to be transferred, the data transferred and stored in the framework of the data backup can be limited to those data for which a need in the data center 106 exists for an update. For example, only those data given which a relevant change has resulted since the last data backup can thus be transferred as backup data.

The data backup can be implemented in the framework of the execution of its own separate service protocol, given which the data backup is implemented as a single service between the franking machine 102 and the data center 106.

However, in other variants of the invention it can also be provided that the data backup is embedded into a service protocol given whose execution another or a number of further services are implemented between the franking machine 102 and the data center 106. For example, it can thus be provided that the data backup ensues in the framework of the execution of what is known as a remote value download given which new credit is loaded from the data center 106 into the franking machine 102.

If it is established in the step 107.2 that a data backup should be implemented, in a data backup step 107.3 a connection between the franking machine 102 and the data center 106 is initially established via the communication network 105. The connection establishment can be initiated both from the data center and from the franking machine 102. The connection establishment can in particular be set in motion immediately when it is detected that a data backup should be implemented.

In a transmission step of the data backup step 107.3, the backup data stored in (among other things) the first memory 102.3 of the franking machine are then transmitted to the data center 106. The backup data are thereby advantageously converted by the processor 102.1 into a semantic format (for example encoded as an XML data stream) and transferred to the data center 106.

In the data center 106 the backup data so transmitted are finally stored in the second memory 106.3 in the data center 106 in a storage step. A sequential storage of the backup data thereby ensues, i.e. the backup data of the current data backup step 107.3 are stored in addition to other possibly, already-present backup data of the franking machine 102 from earlier data backup steps. Thus, a history of backup data is consequently present in the data center 106.

The backup data are stored in a memory region 106.5 of the second memory 106.3, which memory region 106.5 is associated with the first franking machine 102, such that an association of the backup data with the first franking machine 102 thus is already ensured.

The backup data of the first franking machine 102 are additionally stored linked with an ancillary information. In the present example, among other things the ancillary information comprises an identification of the data backup step freely definable by the user of the franking machine 102. This can be, for example, a file name or the like predeterminable by the user of the franking machine 102. The user can assign these file names to the franking machine 102, for example via the input/output unit 102.4. Furthermore, the ancillary information comprises a time information representative of the point in time of the implementation of the data backup step 107.3.

It is thus possible to also identify and to select a specific data backup step (and the backup data thereby saved) at a later point in time using the identification or the point in time. It is possible to reconstruct an earlier configuration state of the franking machine 102 which has already been followed by a number of changes and in particular a number of data backup steps. Using the corresponding backup data (from a data backup step possibly lying far in the past) it is thus possible in a simple manner to correct incorrect settings that have gone undetected over a longer period of time.

The ancillary information can additionally also include an identification of the franking machine 102 (for example a unique and unambiguous serial number) and/or of the user (for example a unique and unambiguous customer number) of the franking machine 102 in order to thus enable a correspondingly simple association of the backup data with the franking machine 102 or, respectively, the user of the franking machine 102. Furthermore, the ancillary information can include a configuration information which is representative for the non-user-definable configuration of the franking machine 102 insofar as the backup data themselves already comprise such configuration information. These can be the type, the software version, etc. of the franking machine, for example.

Finally, the ancillary information can comprise an authorization information required for authorization of the access to the backup data. It is thus possible in a simple manner to fix the supervision of the access to the backup data directly to the backup data. In the simplest case, the authorization information is a password. However, any other (in particular arbitrarily complex) authorization mechanisms can also be implemented.

In the present example the transmission of the backup data from the franking machine 102 to the data center 106 as well as the storage of the backup data ensues using a securing technique such as known cryptographic techniques which are provided by the first security module 102.2 and/or the second security module 106.2. The securing can thereby be done such that the backup data are secured from unauthorized access (for example via a regularization of the read and/or write access or an encryption of the data) and/or from undetected manipulation (for example via what are known as message authentication codes (MAC) or digital signatures etc.).

The backup data can merely be stored for the purpose of the subsequent configuration or reconfiguration of franking machines (described in further detail in the following). However, in the present example the backup data are processed further in a further data processing device 108 of the user of the franking machine 102, which further data processing device 108 can be connected with the data center 106 via the data network 105. For this purpose the backup data are transmitted to the data processing device 108 after storage thereof in a step 107.4.

The data processing device 108 executes an administration program (for example an inventory management program) associated with the user of the franking machine 102, which administration program processes the transmitted backup data further. For example, cost center data from cost centers freely definable by the user can be evaluated and further processed in the data processing device 108 for statistical purposes. It is thus possible to enter such data directly into an inventory management system of the user, such that an elaborate (mostly manual) transfer of such data is no longer required.

Among other things, in the course of this evaluation it is possible to optimize the consumption costs of the user of the franking machine 102 in that, using a usage profile generated from the backup data, the most advantageous postal carrier for the respective determined usage profile is respectively determined overall or for individual cost centers, for example.

Furthermore, in the present example the possibility exists to influence a portion of the backup data stored in the second memory 106.3 via a corresponding modification. The modification can be implemented by any properly authorized party. For example, the user of the franking machine 102 or another correspondingly authorized person or, respectively, device can make such a modification.

In order to implement the modification, the data center 106 of the corresponding authorized person or device enables the access to the backup data stored in the second memory 106.3 via an access source (for example a web portal or the like, that may be secured). As is subsequently explained in further detail, in this manner the party authorized to make modifications can change the configuration of the franking machine 102 and/or further franking machines 103, 104, for example via the modification of corresponding configuration data of the franking machine 102 contained in the backup data.

The modification can relate to any user-definable configuration data that are comprised in the backup data. The modification can be particularly advantageously used in connection with the selection and/or adaptation of cliché data for the franking imprint generated by the respective franking machines 102 through 104. For example, the data center 106 may allow the access storing from data processing device 108 via an access source (for example a web portal or the like) of a properly authorized person or device to a catalog of the cliché data available for the appertaining franking machine 102 through 104 or for its users. By means of this access possibility, the desired cliché can then be selected by generation of a corresponding specification information. The data of this cliché are subsequently introduced into the stored backup data in the modification step, corresponding to the specification information.

The available cliché data can be stored, for example, in the memory region 106.5, 106.6 of the second memory 106.3, which memory region 106.5, 106.6 is associated with the respective franking machine 102 through 104. However, it is also possible for the catalog to include further cliché data that are stored in a third memory 106.7 of the data center 106 and that can be selected for a corresponding fee (i.e. purchased) in the framework of the access.

In a step 107.5 it is therefore checked whether a modification of the backup data should be effected. If this is the case, in a modification step 107.6 the backup data stored in the data center are modified corresponding to the above description. In the present example, the user of the franking machine 102 selects, for example, a new advertising cliché which should appear in his franking imprints.

In the framework of the modification, the previous cliché data contained in the backup data of the last data backup step 107.3 are then replaced by the new cliché data. It is understood that these changes of the backup data of the last data backup step can be appropriate documented in order to be able to re-trace them at a later point in time. It can likewise be provided that with the modification the backup data set of the last data backup step 107.3 can persist and a new backup data set (with the corresponding ancillary information described above, in particular its own identification and its own time information) is merely generated from these. This has the advantage that a gap-free history of the backup data is obtained.

As noted above, the backup data of the data center 106 can be used to modify or to reestablish the configuration of the franking machine 102 or other franking machines 103, 104. For this purpose it is checked in a step 107.7 whether such a configuration should be implemented. This check can ensue both in the appertaining franking machine 102 through 104 or in the data center 106.

Like the data backup, the configuration can also be implemented upon occurrence of arbitrary predeterminable temporal or non-temporal events. In order to achieve a prompt configuration of a franking machine 102 through 104, it can be provided that the configuration ensues immediately at the next establishment of a connection of the appertaining franking machine 102 through 104 with the data center 106 following the data backup step 107.3. In other words, the configuration of the appertaining franking machine 102 through 104 can be immediately forced as soon as the latter establishes a connection with the data center 106.

If it is established in the step 107.7 that a configuration of one of the franking machines 102 through 104 should be effected, the configuration of the appertaining franking machine 102 through 104 ensues in a configuration step 107.8. For this purpose a connection is initially established between the appertaining franking machine 102 through 104 and the data center. Like the data backup, the configuration can also ensue in the framework of its own service protocol. However, it is in turn likewise possible for the configuration to also be embedded into a service protocol, the execution of which allows further services (for example a remote value download) to be implemented between the appertaining franking machine 102 through 104 and the data center 106.

If the connection is established between the appertaining franking machine 102 through 104 and the data center 106, the corresponding backup data (possibly modified in the modification step 107.6) are loaded from the data center 106 into the appertaining franking machine 102 through 104 and there are used to configure the franking machine.

It is understood that, as in the data backup and in the configuration, only the portion of the backup data for which a configuration need exists in the appertaining franking machine 102 through 104 can be loaded into the appertaining franking machine 102 through 104. Thus only the portion of the backup data may be loaded for which a deviation results between the backup data and the current configuration data of the appertaining franking machine 102 through 104. It is thereby understood that the possibility can be provided to the user of the appertaining franking machine 102 through 104 to wholly or partially block the configuration insofar as it is unwanted from the user's viewpoint.

In the present example, the backup data used in the configuration step 107.8 for configuration of the appertaining franking machine 102 through 104 can be selected by the user of the appertaining franking machine 102 through 104 or another authorized person or device. For example, such a selection can be made via a preceding modification in the modification step 107.6 and the corresponding modified backup data set is automatically used for the configuration.

However, it can likewise be provided that, after the communication setup between the appertaining franking machine 102 through 104 and the data center 106, a selection dialog through which the user selects the backup data set to be used, is conducted with the user of the appertaining franking machine 102 through 104 via the input/output unit of the appertaining franking machine 102 through 104. This can particularly be the case when the user initiates the configuration.

As already mentioned, the selected backup data can be loaded again into the same franking machine; for example, the (possibly previously modified) backup data of the first franking machine 102 can be loaded into the first franking machine 102 again for reconfiguration.

This can be useful and necessary when the franking machine 102 is to be configured again after a repair or the like. Furthermore, however, the configuration can simply also only be provided in order to load new cliché data or other configuration data previously selected in the modification step into the franking machine 102. As mentioned, possibly only the cliché data can then also be loaded into the appertaining franking machine in the configuration step 107.8.

However, it is likewise possible to use the (possibly previously modified) backup data of the first franking machine 102 in the configuration step to configure the second franking machine 103 and/or the third franking machine 104. As described above, it is made possible in a simple manner to configure a replacement franking machine or one or more further franking machines 103, 104 corresponding to the first franking machine 102.

In other words, the first franking machine 102 can then be used as a master franking machine whose configuration is transferred to the other franking machines 103, 104 in the framework of the configuration step.

Using such master franking machines it is also possible in a simple manner to enable the user of a new franking machine to effect the fast and simple configuration of his own franking machine in that he initially accesses the data center 106 (via a web portal or the like) and selects from a pool of master franking machines that franking machine (for example the first franking machine 102) whose user-definable configuration comes closest to his ideas. The user can subsequently simply load the corresponding portions of the backup data of the selected master franking machine into his franking machine and in this manner achieve a fast configuration of his new franking machine.

Such a master franking machine can also be a different franking machine, likewise operated by the user of the new franking machine. With the present invention the user of both franking machines (for example, an organization with a number of branches in which one of the franking machines is respectively operated) can then ensure in a simple manner that both franking machines exhibit the same user-definable configuration.

In a step 107.9 it is then checked whether the method workflow should be ended. If this is not the case, the workflow jumps back to step 107.2. Otherwise the method workflow is ended in a step 107.10.

It is to be mentioned that the memory of the franking machine 102 and of the data center 106 described above can be fashioned wholly or in part both as separate memory modules and merely as individual memory regions of a single memory module.

The present invention was described in the preceding using examples with franking machines, but it is understood that it can also be used in connection with any other data processing devices.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for backing up data of a franking machine comprising the steps of:

establishing a connection between a franking machine and a data center remote from the franking machine via a communication network;

via the communication network, transmitting data stored in the franking machine, said data comprising user-definable configuration data for the franking machine that are definable by a user of the franking machine to configure the franking machine, to the data center as back-up data in a transmission step;

executing said transmission step within performance of a service executed between the franking machine and the data center, with said transmission step being executed as a sub-service of said service, said service comprising at least one further sub-service; and storing the back-up data at the data center in a storage step.

2. A method as claimed in claim 1 comprising employing, as said configuration data, at least one of data that configure functions of the franking machine and data that configure a franking imprint that can be generated by the franking machine.

3. A method as claimed in claim 1 comprising employing, as said configuration data, data selected from the group consisting of data that establish menu sequences of the franking machine, data that establish menu contents of the franking machine, and data that associate functions of the franking machine with operations of input devices of the franking machine, and data that organize storage of usage data of the franking machine, and data representing selectable clichés for a franking imprint that can be generated by the franking machine.

4. A method as claimed in claim 1 comprising executing said transmission step at times selected from the group consisting of predetermined points in time and times respectively initiated by a user making an input into the franking machine, and upon initialization of the franking machine, and upon a change of said configuration data that has occurred since a last execution of said transmission step.

5. A method as claimed in claim 1 comprising, in said storage step, linking said configuration data with ancillary information at the data center, and selecting said ancillary information from the group consisting of an identifier for said transmission step, time information representing a point in time of implementation of said transmission step, an identifier that identifies said franking machine, an identifier that identifies a user of the franking machine, configuration information representing a non-user-definable configuration of the franking machine, and authorization information required for authorizing access to said back-up data.

6. A method as claimed in claim 1 comprising storing back-up data at the data center for a plurality of transmission steps for said franking machine.

7. A method as claimed in claim 1 comprising cryptographically securing at least one of the back-up data transmitted in the transmission step and the back-up data stored in the storage step, against unauthorized access or manipulation.

8. A method as claimed in claim 1 comprising processing said back-up data, after said storage step, in a processing device located at a location selected from the group consisting of located at said center and located remote from said data center and being in communication with said data center, and in said data processing device, executing an administration program associated with a user of the franking machine.

9. A method for configuring a franking machine comprising the steps of:

establishing a connection between a franking machine and a data center remote from the franking machine via a communication network;

via the communication network, transmitting data stored in the franking machine, said data comprising user-definable configuration data for the franking machine that are definable by a user of the franking machine to configure the franking machine, to the data center as back-up data in a transmission step;

storing the back-up data at the data center in a storage step;

from a franking machine to be configured, retrieving the back-up data stored at the data center as retrieved back-up data, and configuring said franking machine to be configured using the retrieved back-up data;

prior to configuring said franking machine to be configured, modifying the retrieved back-up data to produce modified back-up data, and loading the modified back-up data into the franking machine to be configured and configuring said franking machine to be configured using said modified back-up data; and said user-definable configuration data in said back-up data comprising cliché data for a franking imprint that can be generated by said franking machine to be configured, and modifying said cliché data as said modified data by replacing a previous cliché in said back-up data with a new cliché, and selecting said new cliché from a plurality of different available cliché data dependent on a specification by a user of the franking machine to be configured.

10. A method as claimed in claim 9 comprising generating said back-up data at a first franking machine and configuring a second franking machine as said franking machine to be configured, using said retrieved back-up data.

11. A method as claimed in claim 10 comprising establishing a communication between said second franking machine and said data center in a configuration step that ensues upon a communication of said second franking machine with said data center following said transmission step executed by said first franking machine.

12. An arrangement for backing up data of a franking machine comprising:

a franking machine comprising a franking machine processor, a franking machine memory containing stored data comprising user-definable configuration data for the franking machine that are definable by a user of the franking machine to configure the franking machine, and a franking machine communication module;

a data center, remote from the franking machine, comprising a data center processor, a data center communication module, and a data center memory;

said franking machine processor being configured to cause said franking machine communication module to establish a communication link with the data center communication module, and said franking machine processor thereafter being configured to execute a transmission step to cause said stored data, including said user-definable configuration data, to be transferred to the data center; and said data center processor being supplied with said stored data from the data center communication module and being configured to execute a storage step to store the stored data transmitted by said franking machine as back-up data in the data center memory; and said franking machine processor being configured to execute said transmission step within performance of a service executed between the franking machine and the data center, with said transmission step being executed as a sub-service of said service, said service comprising at least one further sub-service.

13. An arrangement as claimed in claim 12 wherein said franking machine memory and said data center memory store, as said configuration data, at least one of data that configure functions of the franking machine and data that configure a franking imprint that can be generated by the franking machine.

14. An arrangement as claimed in claim 12 wherein said franking machine memory and said data center memory store, as said configuration data, data selected from the group consisting of data that establish menu sequences of the franking machine, data that establish menu contents of the franking machine, and data that associate functions of the franking machine with operations of input devices of the franking machine, and data that organize storage of usage data of the franking machine, and data representing selectable clichés for a franking imprint that can be generated by the franking machine.

15. An arrangement as claimed in claim 12 wherein said franking machine processor executes said transmission step at times selected from the group consisting of predetermined points in time and times respectively initiated by a user making an input into the franking machine, and upon initialization of the franking machine, and upon a change of said configuration data that has occurred since a last execution of said transmission step.

16. An arrangement as claimed in claim 12 wherein said franking machine processor, in said storage step, is configured to link said configuration data in said data center memory with ancillary information, and to select said ancillary information from the group consisting of an identifier for said transmission step, time information representing a point in time of implementation of said transmission step, an identifier that identifies said franking machine, an identifier that identifies a user of the franking machine, configuration information representing a non-user-definable configuration of the franking machine, and authorization information required for authorizing access to said back-up data.

17. An arrangement as claimed in claim 12 wherein said data center processor is configured to store back-up data in the data center memory for a plurality of transmission steps executed by said franking machine processor.

18. An arrangement as claimed in claim 12 wherein said franking machine processor is configured to cryptographically secure at least one of the back-up data transmitted in the transmission step and wherein the data center processor is configured to cryptographically secure cryptographically secures the back-up data stored in the data center memory, against unauthorized access or manipulation.

19. An arrangement as claimed in claim 12 comprising a further processor configured to access and process said back-up data in said data center memory, after said storage step, said further processor being located at a location selected from the group consisting of located at said center and located remote from said data center and in communication with said data center, and wherein said further processor, executes an administration program associated with a user of the franking machine.

20. An arrangement for backing up data of a franking machine comprising:

a franking machine comprising a franking machine processor, a franking machine memory containing stored data comprising user-definable configuration data for the franking machine that are definable by a user of the franking machine to configure the franking machine, and a franking machine communication module;

a data center, remote from the franking machine, comprising a data center processor, a data center communication module, and a data center memory;

said franking machine processor being configured to cause said franking machine communication module to establish a communication link with the data center communication module, and said franking machine processor being configured to thereafter execute a transmission step to cause said stored data, including said user-definable configuration data, to be transferred to the data center;

said data center processor being supplied with said stored data from the data center communication module and being configured to execute a storage step to store the stored data transmitted by said franking machine as back-up data in the data center memory;

said data center processor being configured to thereafter establish a communication with a franking machine to be configured and to allow retrieval, as retrieved back-up data, of said back-up data stored in said data center memory by said franking machine to be configured, in order to configure said franking machine to be configured using the retrieved back-up data;

said data center processor, prior to configuring said franking machine to be configured, being configured to modify the retrieved back-up data to produce modified back-up data, and to load the modified back-up data into the franking machine to be configured in order to configure said franking machine to be configured using said modified back-up data; and said user-definable configuration data in said back-up data comprising cliché data for a franking imprint that can be generated by said franking machine to be configured, and said data center processor being configured to modify said cliché data as said modified data by replacing a previous cliché in said back-up data with a new cliché, and to select said new cliché from a plurality of different available cliché data dependent on a specification by a user of the franking machine to be configured.

21. An arrangement as claimed in claim 20 wherein said franking machine is a first franking machine and wherein said arrangement comprises a second franking machine, and wherein said first franking machine generates and transmits said back-up data and wherein said data center processor configures said second franking machine as said franking machine to be configured, using said retrieved back-up data.

22. An arrangement as claimed in claim 21 wherein said data center processor is configured to establish a communication between said data center communication module and a further communication module at said second franking machine in a configuration step that ensues upon a communication of said second franking machine with said data center following said transmission step executed by said first franking machine.

23. An arrangement as claimed in claim 20 comprising a data processing device in communication with said data center configured to transmit specification information to the data center specifying said new cliché.

24. An arrangement as claimed in claim 23 wherein said data center communication module is configured to communicate with said data processing device in order to provide overview information thereto describing the different cliché data in order to allow said selection of said new cliché by said data processing device.

* * * * *